US008075119B2

(12) United States Patent
Fairchild

(10) Patent No.: US 8,075,119 B2
(45) Date of Patent: Dec. 13, 2011

(54) METHOD FOR FEEDING SOLID INK STICK WITH MULTIPLE INTERLOCKING AXIS IN A SOLID INK PRINTER

(75) Inventor: Michael Alan Fairchild, Vancouver, WA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/857,353

(22) Filed: Aug. 16, 2010

(65) Prior Publication Data

US 2010/0302329 A1 Dec. 2, 2010

Related U.S. Application Data

(62) Division of application No. 11/716,473, filed on Mar. 9, 2007, now Pat. No. 7,819,513.

(51) Int. Cl.
*B41J 2/175* (2006.01)
*G01D 11/00* (2006.01)

(52) U.S. Cl. .......................................... 347/88; 347/99

(58) Field of Classification Search .................... 347/85, 347/88, 99

See application file for complete search history.

(56) References Cited

U.S. PATENT DOCUMENTS 4,870,430 A * 9/1989 Daggett et al. .................. 347/88
5,223,860 A 6/1993 Loofbourow et al.
5,442,387 A 8/1995 Loofbourow et al.
5,510,821 A 4/1996 Jones et al.
5,975,688 A 11/1999 Kanaya et al.
5,975,690 A 11/1999 Grellmann et al.
6,672,716 B2 * 1/2004 Jones .............................. 347/88
6,755,517 B2 6/2004 Jones et al.
6,761,443 B2 7/2004 Jones
6,840,613 B2 1/2005 Jones
7,419,256 B2 9/2008 Niekawa
7,517,072 B2 4/2009 Jones et al.
7,537,326 B2 5/2009 Jones
7,553,008 B2 6/2009 Jones
7,618,138 B2 11/2009 Rodriguez et al.
7,648,232 B2 1/2010 Jones
2003/0222954 A1 12/2003 Jones et al.
2005/0127181 A1 6/2005 Silverbrook (Continued)

FOREIGN PATENT DOCUMENTS

EP 0820873 A2 1/1998

(Continued)

OTHER PUBLICATIONS

European Search Report (Application No. 08151732.8-2304), European Patent Office, Munich, DE, Mar. 24, 2009, 9 pages.

(Continued)

*Primary Examiner* — Geoffrey Mruk
(74) *Attorney, Agent, or Firm* — Maginot, Moore & Beck LLP

(57) ABSTRACT

A method of feeding solid ink sticks to a melting device in a phase change ink imaging device enables the solid ink sticks to move through the ink delivery system without buckling or being diverted from the feed path. The ink sticks fed to the ink delivery system have first and second contoured ends that complement the feed path to resist buckling due to feed forces and the bosses of one contoured end nest in the boss recesses of another contoured end of an adjacent ink stick to resist the effects of the feed forces as well.

8 Claims, 14 Drawing Sheets

U.S. PATENT DOCUMENTS

| | | | |
|---|---|---|---|
| 2007/0146452 | A1 | 6/2007 | Rodriguez et al. |
| 2007/0236535 | A1 | 10/2007 | Baker et al. |
| 2007/0296779 | A1 | 12/2007 | Tidrick |
| 2007/0296782 | A1 | 12/2007 | Jones et al. |
| 2008/0088684 | A1 | 4/2008 | Titterington et al. |
| 2008/0218572 | A1 | 9/2008 | Fairchild et al. |

FOREIGN PATENT DOCUMENTS

| | | | |
|---|---|---|---|
| EP | 1359014 | A1 | 11/2003 |
| EP | 1359015 | A1 | 11/2003 |
| EP | 1366913 | A2 | 12/2003 |
| EP | 1731309 | A2 | 12/2006 |
| EP | 1967370 | A2 | 9/2008 |

OTHER PUBLICATIONS

European Search Report (Application No. 08151733.6-2304), European Patent Office, Munich, DE, Mar. 24, 2009, 8 pages.

European Search Report (Application No. 08151695.7-1251), European Patent Office, Munich, DE, Feb. 4, 2009, 8 pages.

Non-Final Office Action for U.S. Appl. No. 11/716,125, Mailed Feb. 18, 2010, United States Patent and Trademark Office (7 pages).

Amendment in Response to Non-Final Office Action for U.S. Appl. No. 11/716,125, submitted Apr. 19, 2010 (10 pages).

Non-Final Office Action for U.S. Appl. No. 11/716,473, Mailed Apr. 30, 2010, United States Patent and Trademark Office (9 pages).

Amendment in Response to Non-Final Office Action for U.S. Appl. No. 11/716,473, submitted Jun. 30, 2010 (9 pages).

* cited by examiner

METHOD FOR FEEDING SOLID INK STICK WITH MULTIPLE INTERLOCKING AXIS IN A SOLID INK PRINTER

PRIORITY CLAIM

This application claims priority as a divisional application to U.S. patent application Ser. No. 11/716,473, filed on Mar. 9, 2007, and entitled "Solid Ink Stick Multiple Axis Interlocking." The application to which priority is being claimed issued as U.S. Pat. No. 7,819,513 B2 on Oct. 26, 2010.

CROSS-REFERENCE TO RELATED APPLICATIONS

Reference is made to commonly-assigned co-pending U.S. patent application Ser. No. 11/716,125, filed on Mar. 9, 2007, entitled "Digital Solid Ink Stick Identification and Recognition", by Fairchild et al., commonly-assigned co-pending U.S. patent application Ser. No. 11/716,151, filed on Mar. 9, 2007, entitled "Solid Ink Stick with Reversible Keying and Interlocking Features", by Fairchild et al., and commonly-assigned co-pending U.S. patent application Ser. No. 11/716,148, filed concurrently herewith, entitled "Multi-Position Interlocking Ink Stick", by Esplin et al., the disclosures of which are incorporated herein by reference in their entireties.

TECHNICAL FIELD

This disclosure relates generally to phase change ink jet printers, the solid ink sticks used in such ink jet printers, and the load and feed apparatus for feeding the solid ink sticks within such ink jet printers.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater plate. The heater plate melts the solid ink impinging on the plate into a liquid that is delivered to a print head for jetting onto a recording medium or intermediate transfer surface.

In typical prior art feed channels, the sticks are positioned end to end in straight or linear channels or chutes with a melt device at one end and a spring biased push block on the other end. The space in solid ink printers, however, may be limited, and finding a location within the printer to accommodate a long straight chute for holding an ample supply of ink may be a challenge. The amount of ink that can be accommodated is limited by the physical dimensions of the printer and can not be greater with a linear ink loader than the length or width of available positions in the printer.

One method that has been used to increase the amount of ink that may be placed in a feed channel is to provide non-linear feed channels. The non-linear feed channels may include any number of linear and curved sections that can feed and guide ink sticks from an insertion end to a melt end of the feed channel. The non-linear feed channels typically include a feed mechanism, such as a belt, configured to move the ink sticks along the non-vertically oriented feed path of the channel. The use of rectangular sticks in channels that are curved or have an arcuate portion may result in buckling and camming of adjacent ink sticks in the feed channel.

Moreover, in previously known phase change ink jet printing systems, the interface between a control system for a phase change ink jet printer and a solid ink stick provided little information about the solid ink sticks loaded in the printer. For instance, control systems are not able to determine if the correct color of ink stick is loaded in a particular feed channel or if the ink that is loaded is compatible with that particular printer. Provisions have been made to ensure that an ink stick is correctly loaded into the intended feed channel and to ensure that the ink stick is compatible with that printer. These provisions, however, are generally directed toward physically excluding wrong colored or incompatible ink sticks from being inserted into the feed channels of the printer. For example, the correct loading of ink sticks has been accomplished by incorporating keying, alignment and orientation features into the exterior surface of an ink stick. These features are protuberances or indentations that are located in different positions on an ink stick. Corresponding keys or guide elements on the perimeters of the openings through which the ink sticks are inserted or fed exclude ink sticks which do not have the appropriate perimeter key elements while ensuring that the ink stick is properly aligned and oriented in the feed channel.

While this method is effective in ensuring correct loading of ink sticks in most situations, there are situations when an ink stick may be incorrectly loaded into a feed channel of a printer, newer ink loaders using larger sticks are particularly vulnerable to inappropriate use of earlier, smaller sticks. World markets with various pricing and color table preferences have created a situation where multiple ink types may exist in the market simultaneously with nearly identical size/shape ink and/or ink packaging. Thus, ink sticks may appear to be substantially the same but, in fact, may be intended for different phase change printing systems due to factors such as, for example, market pricing or color table. In addition, due to the soft, waxy nature of an ink stick body, an ink stick may be "forced" through an opening into a feed channel. This is easily done with earlier, smaller size sticks, most of which have a different, non-compatible, ink formulation. The printer control system, having no information regarding the configuration of the ink stick, may then conduct normal printing operations with an incorrectly loaded ink stick. If the loaded ink stick is the wrong color for a particular feed channel or if the ink stick is incompatible with the phase change ink jet printer in which it is being used, considerable errors and malfunctions may occur.

SUMMARY

In one embodiment, an ink stick for use in an ink delivery system of a phase change ink imaging device comprises an ink stick body having first and second opposed ends and the ends are contoured to resist buckling when sticks are forced into contact. The ink stick body includes a first interlocking face at the first end and a second interlocking face at the second end. Each interlocking face includes a plurality of bosses and a plurality of boss recesses, the plurality of boss recesses of the first interlocking face are sized and positioned complementary to the plurality of bosses of the second interlocking face, and the plurality of boss recesses of the second interlocking face being sized and positioned complementary to the plurality of bosses of the first interlocking face.

In another embodiment, a method of feeding ink sticks in an ink delivery system of a phase change ink imaging device comprises receiving a first and a second ink stick on a feed path of an ink delivery system of a phase change ink imaging device; and nesting a plurality of bosses on a trailing end of the first ink stick in a plurality of boss recesses of the leading end of the second ink stick and nesting a plurality of bosses on the leading end of the second ink stick in a plurality of boss recesses on the trailing end of the first ink stick, the plurality of nested bosses and boss recesses acting to limit horizontal and vertical movement of the first and second ink sticks with respect to each other. The method of feeding further includes contouring the ink ends so that adjacent sticks resist buckling due to feed forces pressing them together.

In yet another embodiment, a solid ink stick for use in a phase change ink imaging device comprises an ink stick body having a first and a second end. The ends are contoured to resist buckling when two sticks are pressed together end to end. An interlocking face is on each of the first and second ends. Each interlocking face comprises a first and a second boss and a first and a second boss recess. The first and second boss recesses of the first end are sized and positioned complementary to the first and second bosses of the second end, and the first and second boss recesses of the second end are sized and positioned complementary to the first and second bosses of the first end.

DETAILED DESCRIPTION OF THE PREFERRED EMBODIMENT

Figure 1:
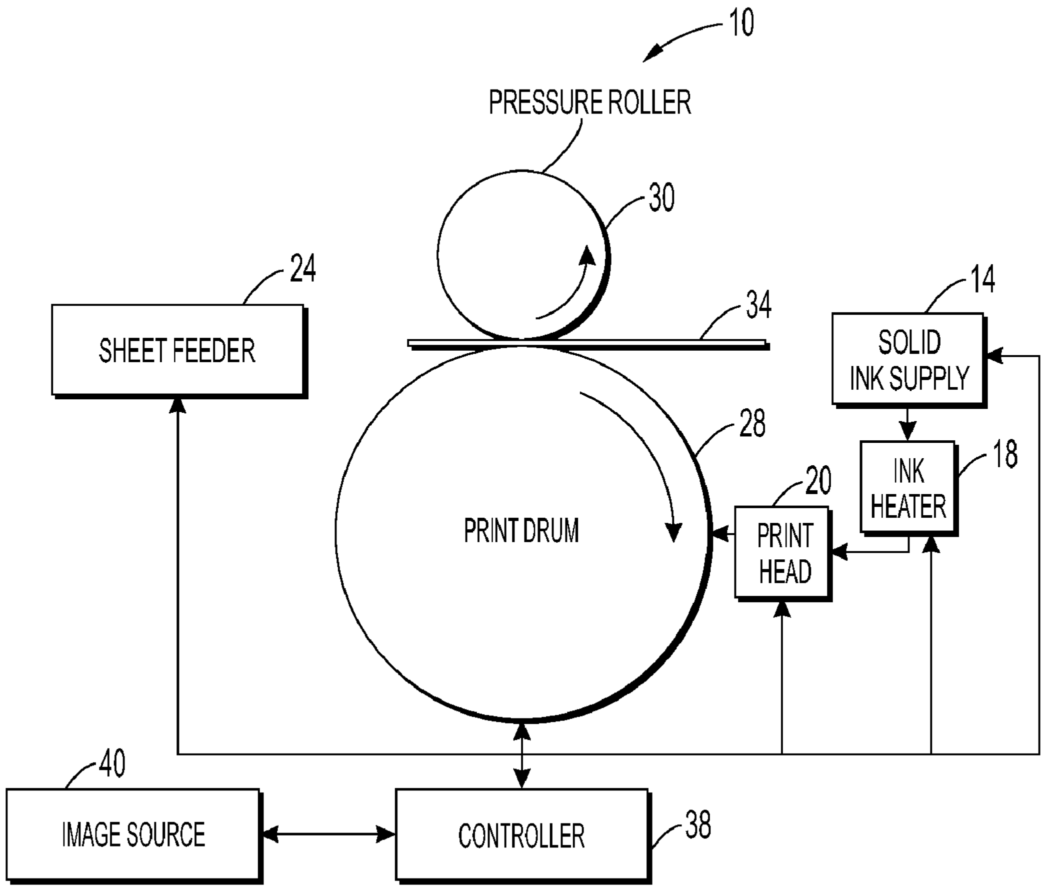
FIG. 1 PRIOR ART
FIG. 1 is a block diagram of a phase change ink imaging device.

For a general understanding of the present embodiments, reference is made to the drawings. In the drawings, like reference numerals have been used throughout to designate like elements. As used herein, the term "printer" refers, for example, to reproduction devices in general, such as printers, facsimile machines, copiers, and related multi-function products, and the term "print job" refers, for example, to information including the electronic item or items to be reproduced. References to ink delivery or transfer from an ink cartridge or housing to a printhead are intended to encompass the range of melters, intermediate connections, tubes, manifolds and/or other components and/or functions that may be involved in a printing system but are not immediately significant to the present invention.

Referring now to FIG. 1, there is illustrated a block diagram of an embodiment of a phase change ink imaging device 10. The imaging device 10 has an ink supply 14 which receives and stages solid ink sticks. An ink melt unit 18 melts the ink by raising the temperature of the ink sufficiently above its melting point. The liquefied ink is supplied to a printhead assembly 20 by gravity, pump action, or both. The imaging device 10 may be a direct printing device or an offset printing device. In a direct printing device, the ink may be emitted by the print head 20 directly onto the surface of a receiving surface or medium.

The embodiment of FIG. 1 shows an indirect, or offset, printing device. In offset printers, the ink is emitted onto an intermediate transfer surface 28 that is shown in the form of a transfer film on a drum, but the drum could be in the form of a supported endless belt. To facilitate the image transfer process, a pressure roller 30 presses the media 34 against the film on the drum 28, whereby the ink is transferred from the drum 28 to the media 34. The pressure and heat in the nip between the drum 28 and the roller 30 transfers the inked image from the drum 28 onto the recording medium 34.

Operation and control of the various subsystems, components and functions of the machine or printer 10 are performed with the aid of a controller 38. The controller 38, for example, may be a micro-controller having a central processor unit (CPU), electronic storage, and a display or user interface (UI). The controller reads, captures, prepares and manages the image data flow between image sources 40, such as a scanner or computer, and the printhead assembly 20. The controller 38 is the main multi-tasking processor for operating and controlling all of the other machine subsystems and functions, including the machine's printing operations, and, thus, includes the necessary hardware, software, etc. for controlling these various systems.

Figure 2:
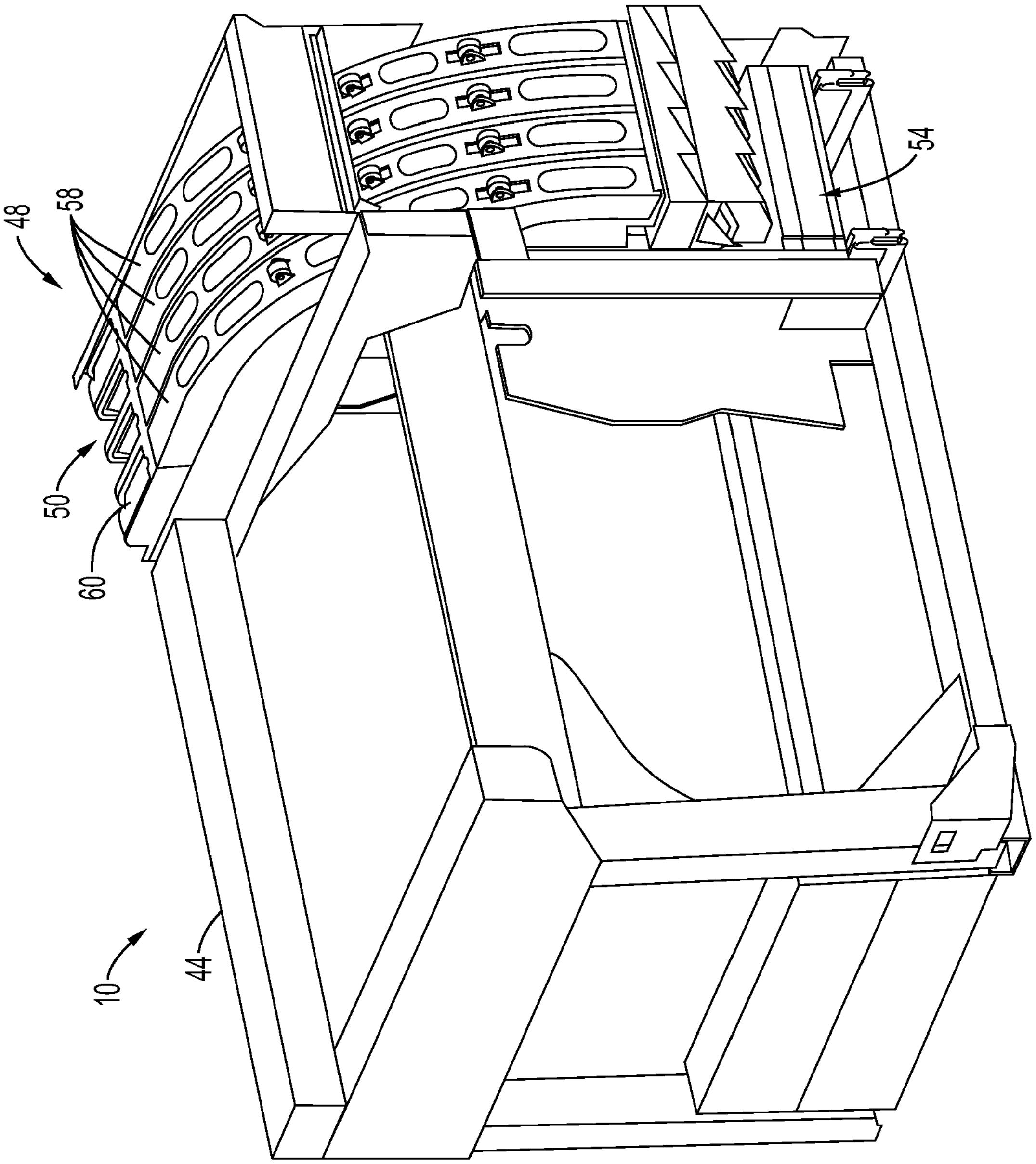
FIG. 2 is an enlarged partial top perspective view of an embodiment of a phase change ink imaging device.

Referring now to FIG. 2, the device 10 includes a frame 11 to which are mounted directly or indirectly all its operating subsystems and components, such as those described above. In particular, there is shown the solid ink delivery system 48. The solid ink delivery system 48 advances ink sticks from loading station 50 to a melting station 54. The melting station 54 is configured to melt the solid ink sticks and supply the liquid ink to a printhead system (not shown). All forms of solid ink are referred to as ink sticks or simply ink or sticks.

The ink delivery system 48 includes a plurality of channels, or chutes, 58. A separate channel 58 is utilized for each of the four colors: namely cyan, magenta, black and yellow. Color order mentioned here and elsewhere is not necessarily representative of the product and for the purpose of this invention, is not significant.

The loading station includes keyed openings 60. Each keyed opening 60 provides access to an insertion end of one of several individual feed channels 58 of the ink delivery system. The keyed openings 60 are configured to interact with key elements formed in ink sticks to admit or block insertion of the ink through the keyed insertion opening of the ink delivery system.

To better utilize the space within the imaging device 10, the feed channels 58 may have a shape that is not linear such that a greater number of ink sticks may be placed therein than may be possible with a linear feed channel. Therefore, feed channels 58 may define any suitable path for delivering ink sticks from the loading station 50 to the melt station 54. For example, the feed channels 58 may have linear and curved sections as needed to deliver respective ink sticks from the loading station 50 to the melting station 54. An arcuate portion of the feed path may be short or may be a substantial portion of the path length. The full length of the chute may be arcuate and may consist of different or variable radii. A linear portion of the feed path may likewise be short or a substantial portion of the path length.

Figure 3:
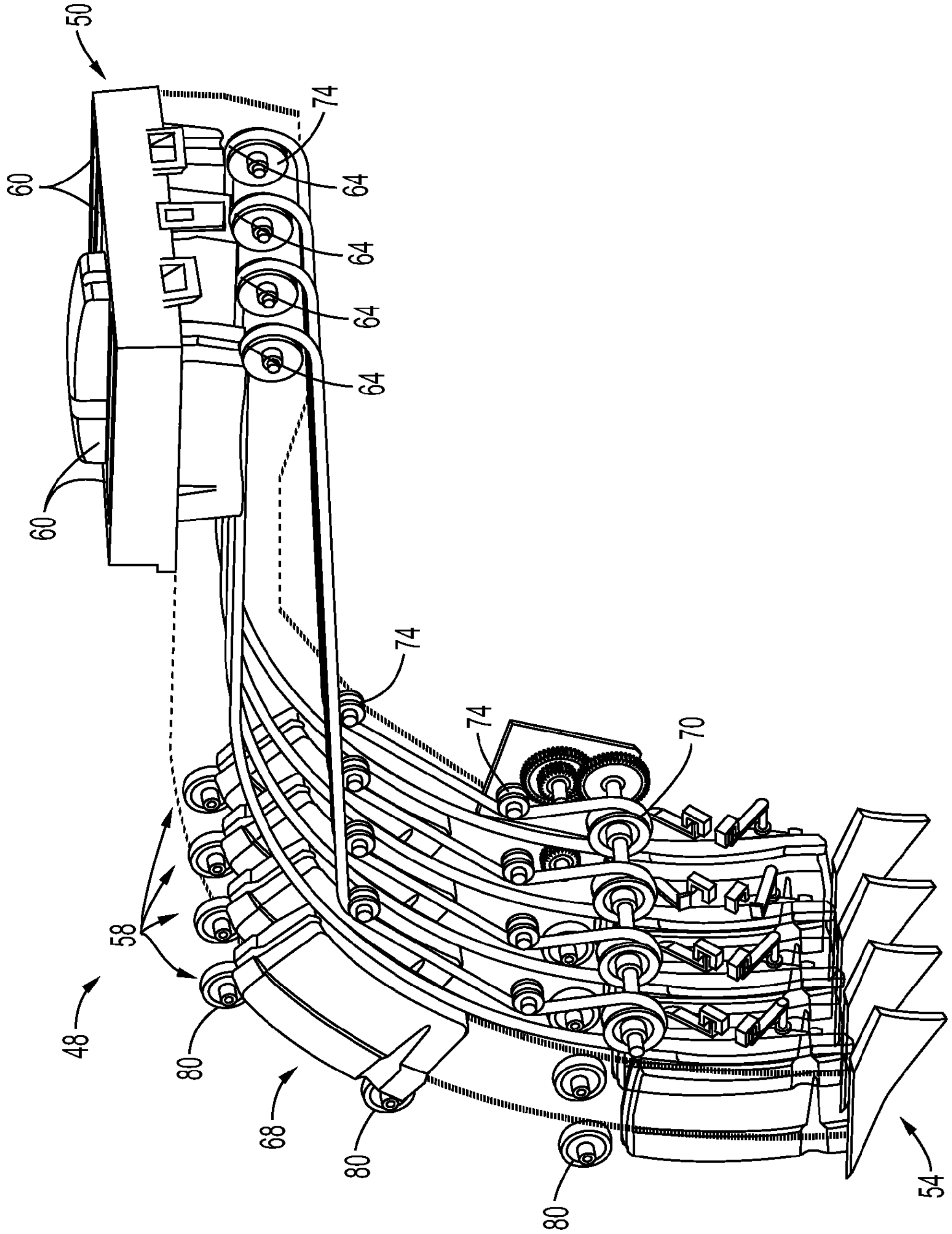
FIG. 3 is a perspective view of the solid ink delivery system of the imaging device of FIG. 2.

Referring to FIG. 3, the solid ink delivery system 48 further includes a drive member 64 for moving one or more ink sticks 68 along the feed path in the respective feed channel 58. A separate drive member 64 may be provided for each respective feed channel. In one embodiment, a drive member 64 comprises a belt that extends along a substantial portion of the path of the feed channel 58. The feed channel 58 for each ink color retains and guides ink so that the ink progresses along a desired feed path. The drive member 64 may have any suitable size and shape. The drive member 64 may be used to transport the ink over all or a portion of the feed path and may provide support or guidance to the ink and may be the primary ink guide over all or a portion of the feed path.

The belt 64 may, as shown in FIG. 3, have a circular cross-section and be held taut by a pair of spaced apart pulleys in the form of a drive pulley 70 and one or more idle pulleys 74. The drive pulley 70 may be rotated by any suitable device such as, for example, by a motor assembly 78. The motor may be bi-directional for moving ink sticks forward and backward along the feed path. A loader with linear and non linear portions must provide guidance to the ink over the full feed path, including transitions and sections where gravity does not force intimate contact. Thus, ink guidance may include a transport and other elements of the channel, individually or in concert, as appropriate for the feed path. For example, the feed channels may include nudging members 80 in the form of, for example, pinch rollers that may be spring loaded and biased against the belt 64 to assure sufficient friction between the belt 64 and the sticks 68 such that the sticks do not fall by gravity and slip away from the belt 64.

Figure 4:
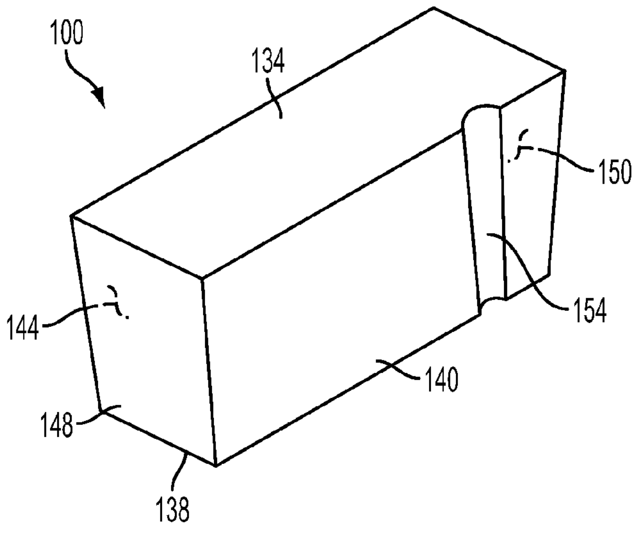
FIG. 4 is a perspective view of one embodiment of a solid ink stick.
Figure 6:
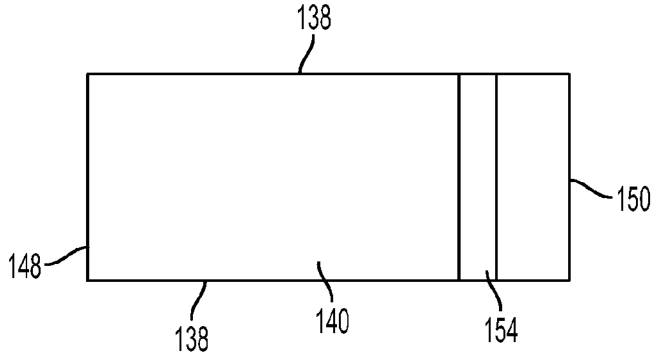
FIG. 6 is a side view of the solid ink stick of FIG. 4.

An ink stick may take many forms. One exemplary solid ink stick 100 for use in the ink delivery system 20 is illustrated in FIGS. 4 and 6. The ink stick has a bottom surface 134 and a top surface 138. The particular bottom surface 134 and top surface 138 illustrated are substantially parallel one another, although they can take on other contours and relative relationships. Moreover, the surfaces of the ink stick body need not be flat, nor need they be parallel or perpendicular one another. The ink stick body also has a plurality of side extremities, such as lateral side surfaces 140, 144 and end surfaces 148, 150. The side surfaces 140 and 144 are substantially parallel one another, and are substantially perpendicular to the top and bottom surfaces 134, 138. The end surfaces 148, 150 are also basically substantially parallel one another, and substantially perpendicular to the top and bottom surfaces, and to the lateral side surfaces. One of the end surfaces 148 is a leading end surface, and the other end surface 150 is a trailing end surface. The ink stick body may be formed by pour molding, injection molding, compression molding, or other known techniques.

Figure 5:
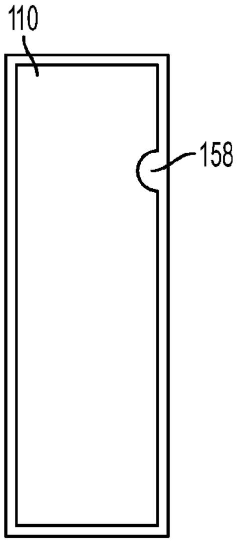
FIG. 5 is a top view of a keyed opening of the ink delivery system.

Referring again to FIGS. 4 and 6, the ink stick may include one or more insertion keying features 154. The stick keying features interact with the keyed openings 110 of the loading station 108 to admit or block insertion of the ink sticks through the insertion opening of the solid ink delivery system 20. In the ink stick embodiment of FIG. 4, the key element 154 is a vertical recess or notch formed in side surface 140 of the ink stick body. The corresponding complementary key 158 on the perimeter of the keyed opening 110 is a complementary protrusion 158 into the opening 110 (See FIG. 5). Any number or shape of key features may employed in any suitable position on the ink stick.

Figure 7:
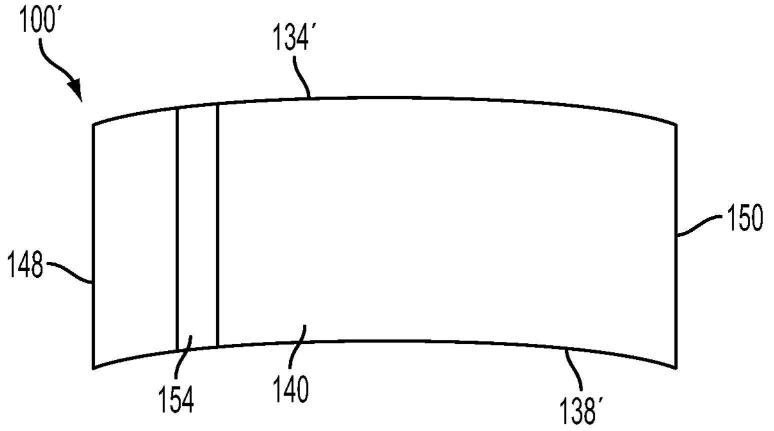
FIG. 7 is a side view of another embodiment of a solid ink stick.
Figure 8:
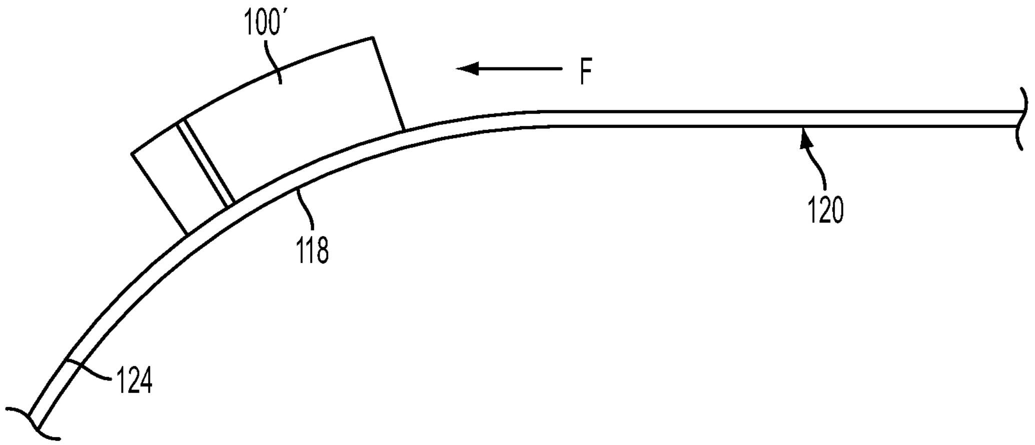
FIG. 8 is a side view of the ink stick of FIG. 7 on a non-linear portion of a feed path of the ink delivery system.

As mentioned above, the feed path defined by the feed channel may include linear as well as arcuate, or curved sections. To facilitate feeding of ink sticks along the curved portions of the feed path, the bottom surface 138' of the ink stick may 100' be curved as shown in FIG. 7. All or a portion of the bottom surface 138' may be advantageously curved at substantially the same radius as the curved portion 118 of the feed channel as shown in FIG. 8. Similarly curved surfaces between the feed channel and the ink stick 100 allows the ink stick 100 to rest substantially flush with the surface of the drive member 124 along the curved sections 118 of the channel. Such a configuration may alleviate buckling, camming, or jamming, of the stick 100 within the channel.

Figure 9:
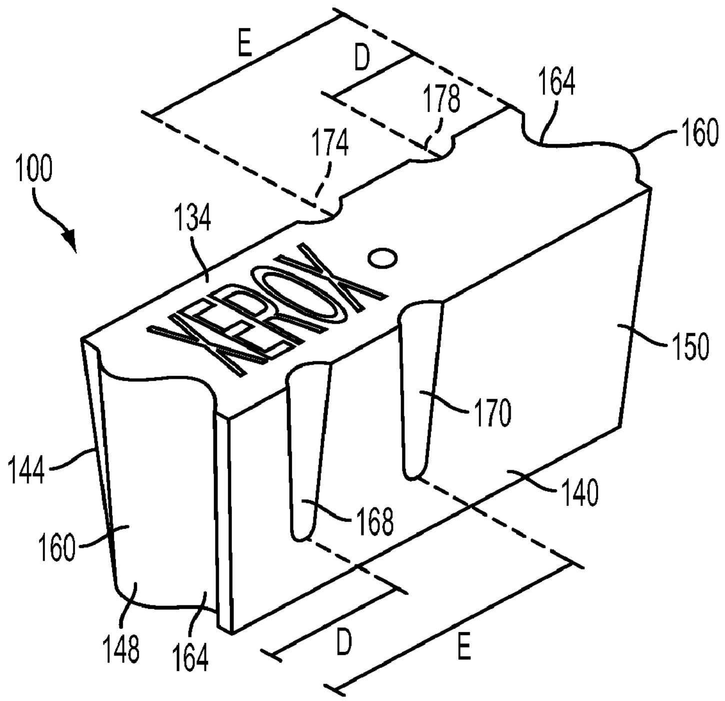
FIG. 9 is a top perspective view of another embodiment of a solid ink stick.
Figure 11:
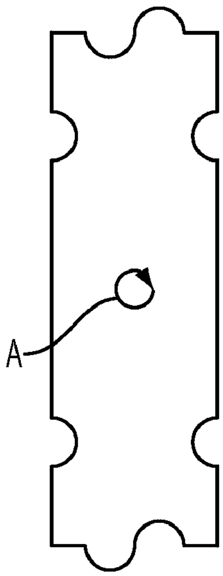
FIG. 11 is a top view of another embodiment of ink stick having rotational symmetry.
Figure 12:
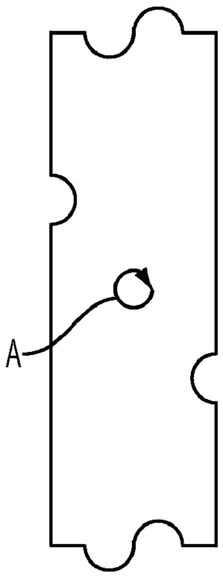
FIG. 12 is a top view of another embodiment of ink stick having rotational symmetry.
Figure 13:
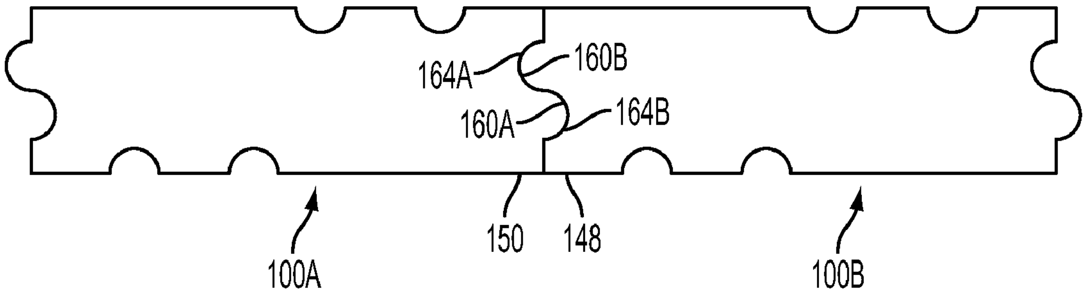
FIG. 13 is a top view of two ink sticks with nested interlocking features.

Referring now to FIG. 9, there is shown an embodiment of a solid ink stick that incorporates interlocking features at the leading and trailing ends 148, 150 to ensure reliable movement of the ink sticks along the feed channel. In one embodiment, the interlocking features comprise a vertically extending ridge or protrusion 160 positioned adjacent a vertically extending recess 164 at each of the leading and trailing ends of the ink stick forming a substantially S shaped contour at the ends of the ink stick (See FIGS. 10-13). As can be seen in FIGS. 9-13, the position of the ridge 160 of the interlocking feature at one end of the ink stick mirrors the position of the recess 164 at the opposite end of the ink stick and vice versa. This configuration allows adjacent ink sticks to abut, or nest, in a feed channel as shown in FIG. 13. For instance, referring again to FIG. 13, the leading end 148B of ink stick 100B may abut the trailing end 150A of ink stick 100A with the protrusion 160B resting against the recess 164A and the recess 164B resting against the protrusion 160A. Interlocking ink sticks in a feed channel provide the benefit of limiting lateral movement of the ink sticks relative one another. By limiting movement of the ink sticks with respect to one another, the tendency for ink sticks to become skewed with respect to each other, or with respect to the feed channel, is mitigated or eliminated as the ink sticks travel along the feed path.

Figure 10:
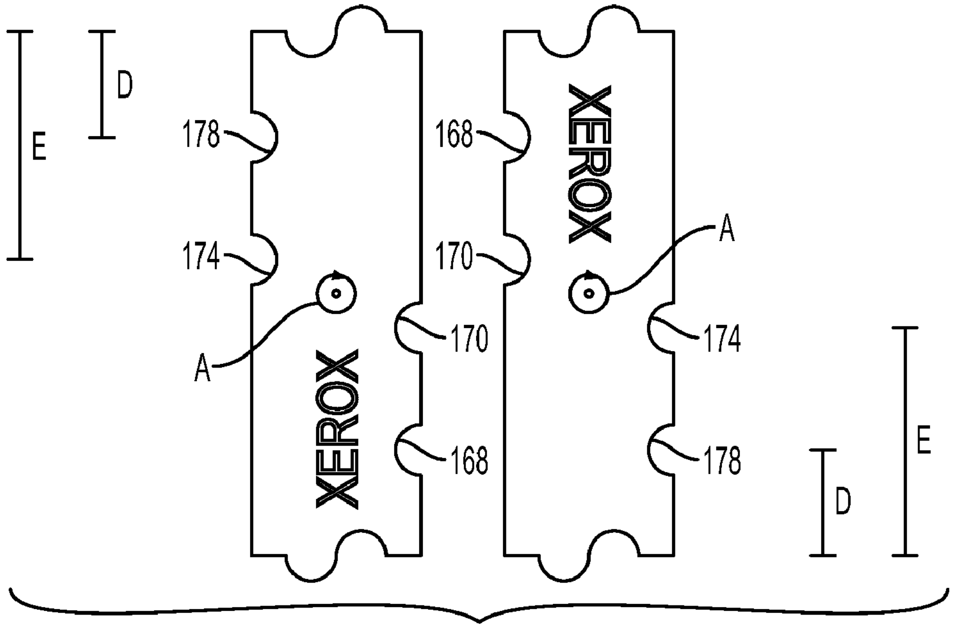
FIG. 10 is a top view of the ink stick of FIG. 9 showing rotational symmetry.

Referring again to FIGS. 9-12, ink sticks that include complementarily shaped interlocking features at the ends of the ink stick allows the formation of a reversible ink stick, or, in other words, an ink stick that may be inserted through complementarily shaped keyed openings without regard to which end of the ink stick is forward. To facilitate reversible insertion, the ink stick may include reversible keying features along the side surfaces 140, 144 of the ink stick. To this end, the keying features 168, 170 along side 140 are positioned relative to the end 148 substantially the same as the keying features 178, 174 along side 144. For example, keying features 168 and 178 are each spaced a distance D from the respective ends, 148 and 150. Keying features 170 and 174 are each spaced a distance E from the respective ends, 148 and 150. Thus, the ink stick is configured such that it exhibits 180° rotational symmetry. For example, as can be seen in FIG. 10, the ink stick may be rotated 180° along the axis of rotation A and exhibit the same shape in either position as viewed from the top. FIGS. 11 and 12 show alternative embodiments of reversibly keyed ink sticks. The ink sticks of FIGS. 11 and 12 may each be rotated 180° about the axis of rotation A and have substantially the same shape as viewed from the top.

Thus, reversible ink sticks may be inserted into a complementarily shaped keyed opening of an ink loader in at least two orientations. When configured for reversible insertion, the leading end 148 of the ink stick does not have to be oriented toward the melt end of the feed channel, nor does the trailing end necessarily have to be oriented toward the insertion end of the feed channel. A reversible ink stick may be oriented such that either of the leading and trailing ends may be oriented toward the melt end of the feed channel.

Figure 14:
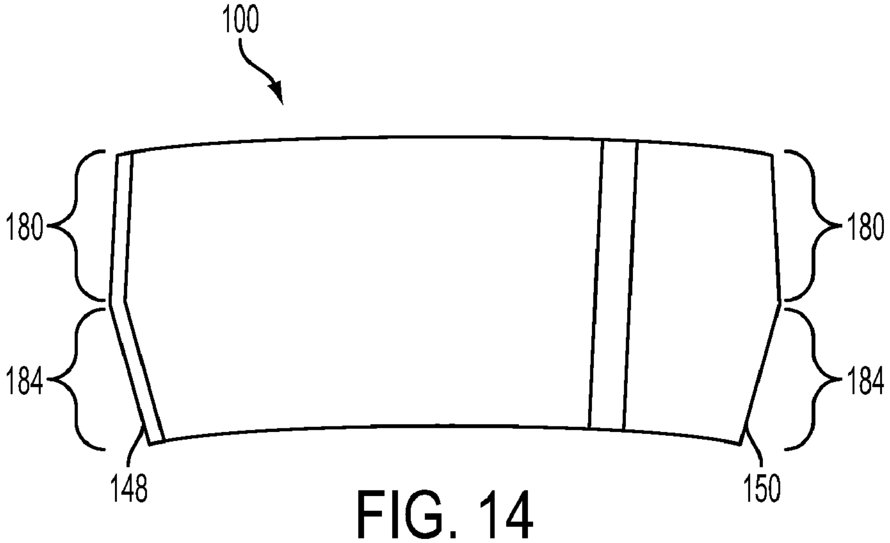
FIG. 14 is a side view of another embodiment of solid ink stick.
Figure 17:
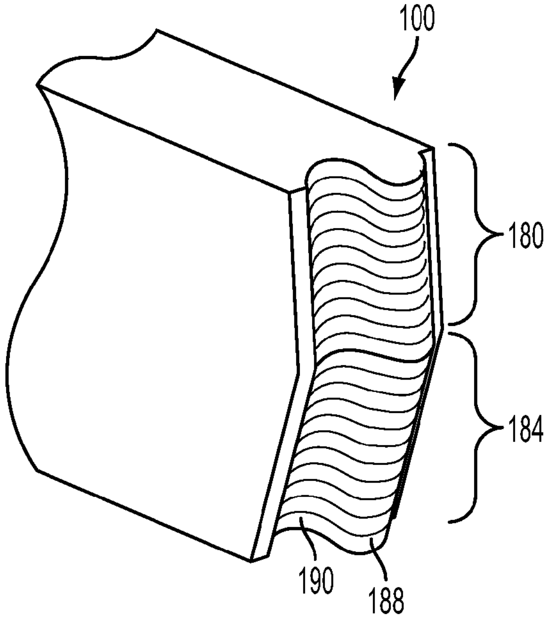
FIG. 17 is a close-up top perspective view of an end of the ink stick of FIG. 14.

To further ensure reliable movement of ink sticks along a feed path that has both curved and linear sections, the ink stick may be configured with end contours and interlocking features such that adjacent ink sticks may reliably interlock in all sections of the feed channel while also resisting any tendency to buckle as end to end feed forces are applied. Referring now to FIGS. 14 and 17, there is shown an embodiment of an ink stick 100 that includes a multiple-position interlocking feature at the leading and trailing ends of the ink stick that is configured such that at least a portion of the interlocking features of adjacent ink sticks abut, or nest, in all of the sections of the feed path. Referring to FIG. 17, there is shown an end of an ink stick that includes a multi-position interlocking feature configured for use with a non linear feed path, such as one having curved and linear sections. As can be seen, the multi-position interlocking feature may include a vertically extending protrusion 188 adjacent to a vertically extending recess 190 similar to the interlocking feature shown on the ink stick in FIG. 9. Reference to vertical is made with respect to stick orientation with a downward angle (or illustration view)—this could be described as front to back with respect to a more horizontal orientation.

Figure 15:
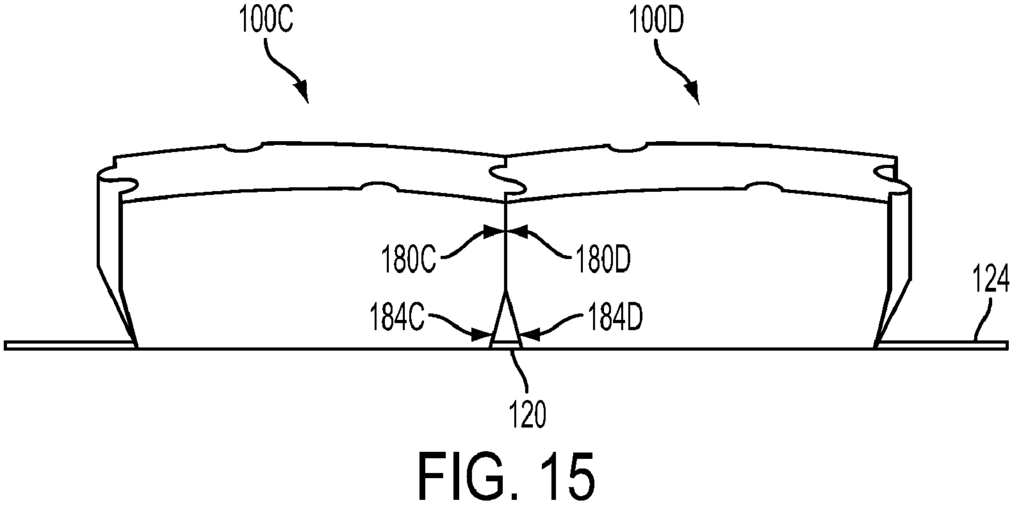
FIG. 15 is a side view of two of the ink sticks of FIG. 14 abutting on a linear portion of a feed path.

In the embodiment of FIGS. 14 and 17, the multi-position interlocking feature includes first and second interlocking segments 180, 184. The first interlocking segment is configured to abut, or nest, with a first interlocking segment of an adjacent ink stick when the ink sticks are in a linear section of the feed channel as shown in FIG. 15. The second interlocking segment is configured to abut, or nest, with a second interlocking segment of an adjacent ink stick and when the ink sticks are in a curved section of the feed channel, may appear as shown in FIG. 16.

Figure 16:
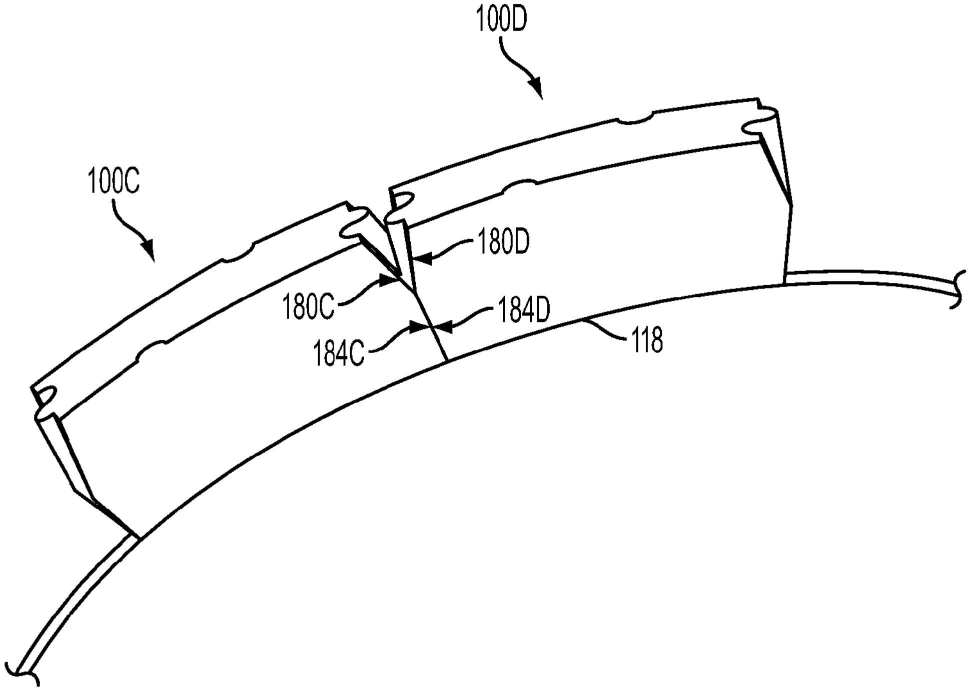
FIG. 16 is a side view of two of the ink sticks of FIG. 14 abutting on a non-linear portion of a feed path.

In the embodiment of FIGS. 14-17, the first and second segments of the interlocking feature are substantially linear portions of the end surfaces as view from the side. The first segment 180 of the leading end 148 is angled with respect to the first segment 180 of the trailing end 150 such that the first segment of a first ink stick may abut the first segment of an adjacent ink stick when in the feed channel when the ink sticks are in a linear section 120 of the feed path. For example, as seen in FIG. 15, substantially the entire first segment 180C of the interlocking feature of ink stick 100C is nested with the first segment 180D of the interlocking feature of ink stick 100D. Similarly, the second segment 184 of the leading end 148 is angled with respect to the second segment 184 of the trailing end 150 such that the second segment of a first ink stick may abut the second segment of an adjacent ink stick when in a curved section 118 of the feed channel. For example, as seen in FIG. 16, substantially the entire second segment 180C of the interlocking feature of ink stick 100C is nested with the second segment 100D of the interlocking feature of ink stick 100D when the ink sticks are in a curved section of the feed path.

Referring again to FIGS. 15 and 16, the ink stick may include a transition interlocking feature 186. The transition interlocking configuration 186 comprises the portion of the interlocking feature situated substantially between the first and second interlocking segments 180, 184. The transition interlocking configuration is configured to interlock with an adjacent ink stick as the ink sticks transition from linear to non-linear sections of the feed path, thus, ensuring that the ink sticks limit lateral movement as feed progresses.

Although the exemplary ink stick of FIGS. 15 and 16 depict two interlocking segments 180, 184, the ink stick may include more interlocking segments for interlocking with adjacent ink sticks in various sections of the feed path. Moreover, although the first and second segments of the multi-position interlocking features are shown as substantially linear segments, the first and second segments may be curved. Alternatively, substantially the entire leading and trailing ends may be curved so that at least a portion of the interlocking features of adjacent ink sticks may abut in a wide variety of feed path configurations including two or three dimensional paths and/or any combination or number of linear sections, downwardly and upwardly curved sections, and curved sections of various or varying radii.

Figure 18:
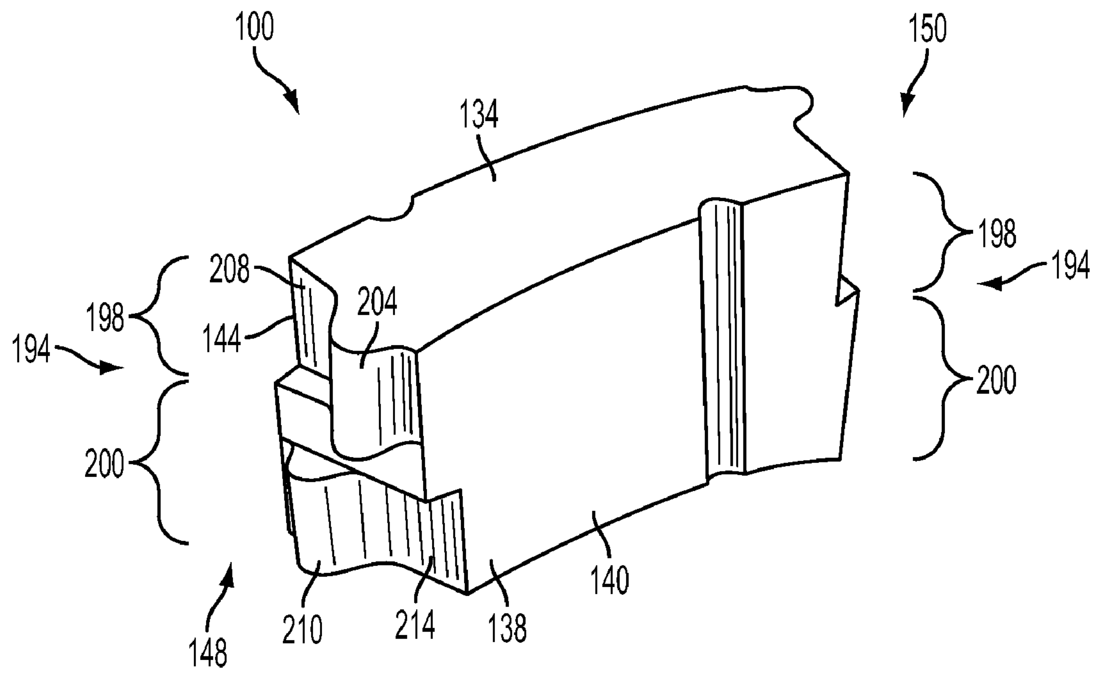
FIG. 18 is a top perspective view of another embodiment of a solid ink stick.
Figure 19:
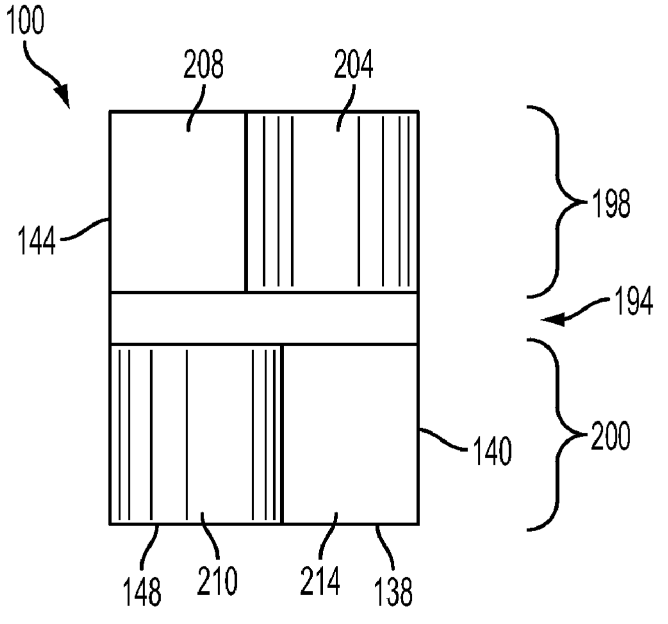
FIG. 19 is an end view of the ink stick of FIG. 18.

The interlocking features described above in regards to FIGS. 9-17 are generally useful for limiting horizontal or lateral movement of adjacent ink sticks in a feed channel relative to one another. Referring now to FIGS. 18 and 19, there is shown an embodiment of an ink stick that includes an interlocking feature configured to limit multiple-axis movement of adjacent ink sticks in a feed channel relative to one another. The multiple-axis interlocking feature 194 includes a plurality of bosses, or protrusions, 204, and a plurality of boss recesses 208 positioned at each end of the ink stick. The plurality of boss recesses 208 of one end being sized and positioned complementary to the plurality of bosses 204 of the other end.

In the embodiment of FIG. 18, the interlocking feature 194 has an upper segment 198 that includes a boss 204 adjacent to a boss recess 208. The multiple-axis interlocking feature also has a lower segment 200 that includes a boss 210 adjacent to a boss recess 214. The boss 204 of the upper segment is positioned at least partially above the recess 214 of the lower segment and the boss 210 of the lower segment is positioned at least partially below the recess 208 of the upper segment. Each end 148, 150 of the ink stick is configured substantially the same.

Figure 20:
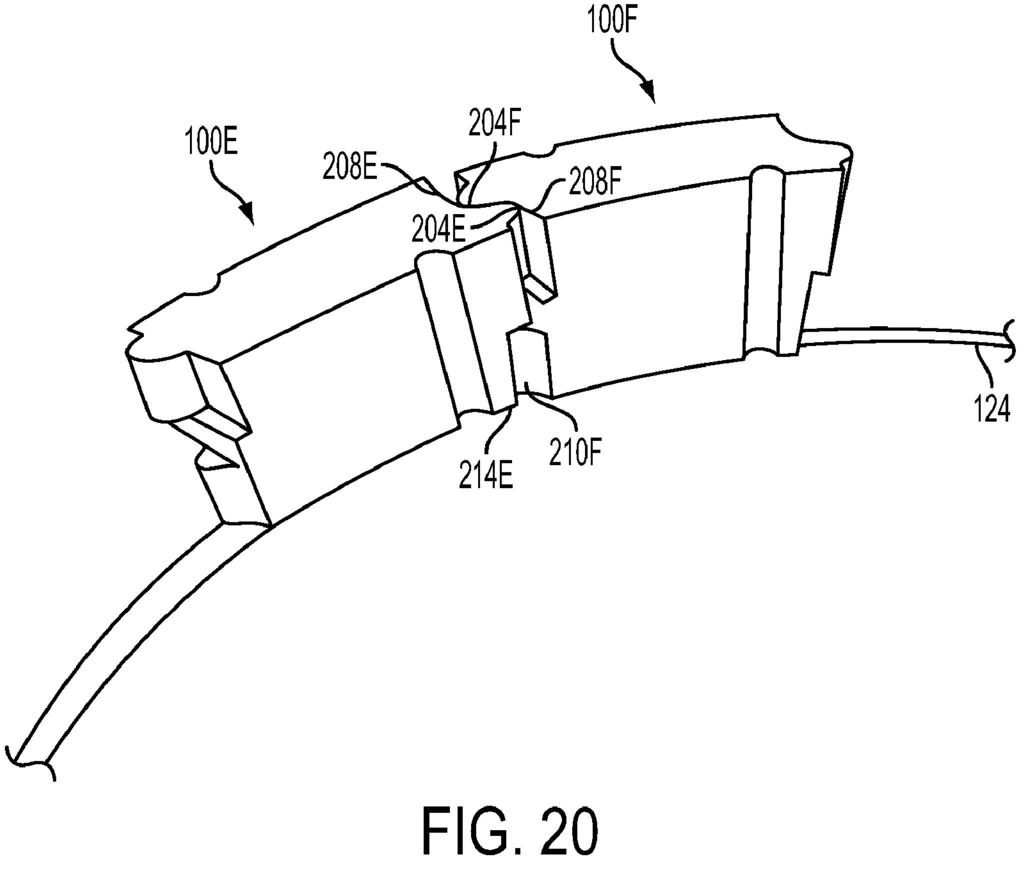
FIG. 20 is a top perspective view of two ink sticks of FIG. 18 abutting.

Thus, referring to FIG. 20, the boss 204 of the upper segment 198 of a first ink stick 100F may nest in the recess 208E of the upper segment of an adjacent ink stick 100E, and the boss 204E of the upper segment of the adjacent ink stick 100E may nest in the recess 208F of the first ink stick 100F. Meanwhile, boss 210F of the lower segment of the first ink stick 100F may nest in the recess 214E of the lower segment of the adjacent ink stick 100E, and the boss 210E of the adjacent ink stick 100E may nest in the recess 214F of the lower segment of the first ink stick 100F. The interaction of the protrusion and recesses of the upper and lower segment of adjacent ink sticks in a feed channel may act to restrict vertical and horizontal movement of the ink sticks with respect to each other in the feed channel.

A multiple-axis interlocking feature may have any number of suitable configurations. For instance, there may be any number of bosses and boss recesses formed on the ends of the ink stick. In the embodiments of FIGS. 18-20, the ink sticks are substantially rotationally symmetrical, however, ink sticks including multiple-axis interlocking features need not be rotationally symmetric.

Figure 21:
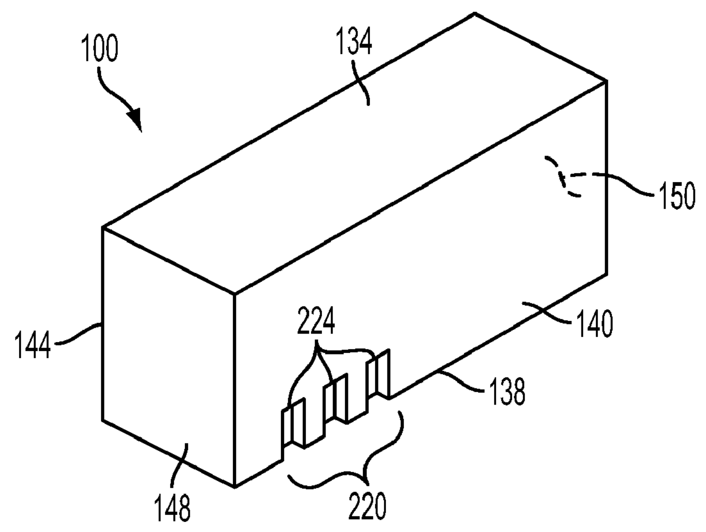
FIG. 21 is a top perspective view of another embodiment of a solid ink stick.

The embodiments of ink sticks described above may be useful for ensuring reliable feeding of ink sticks along linear and non-linear segments of a feed path. Referring now to FIG. 21, there is shown an embodiment of an ink stick configured to interact with a control system of an imaging device to provide control or attribute information to the control system to further ensure compatible ink sticks are being used in the imaging device and to further ensure reliable feeding of the ink sticks. The ink stick of FIG. 21 includes a coded sensor feature 220 for encoding variable control information or attribute information into the ink stick 100. The coded sensor feature 80 includes a plurality of code elements 224 formed in one or more surfaces of the ink stick 100. Each code element 224 of the coded sensor feature 224 is formed in a predetermined location on the ink stick 100 and is configured to actuate one or more sensors 228 in a load or feed area 108 of the ink delivery system 20. The code elements may be curved, spherical, angled, square or any shape that permits reliable sensor actuation, directly or indirectly, such as by moving a flag or actuator or using an optical sense system. For example, the code elements 224 of the coded sensor feature 220 in FIG. 21 comprise insets.

Although the ink stick of FIG. 21 is shown as a substantially cubic block, the ink stick may include the interlocking features described above, as well as other features and elements that may be needed. For instance, the ink stick may include keying, guiding, alignment, sensing and/or orientation features.

Figure 23:
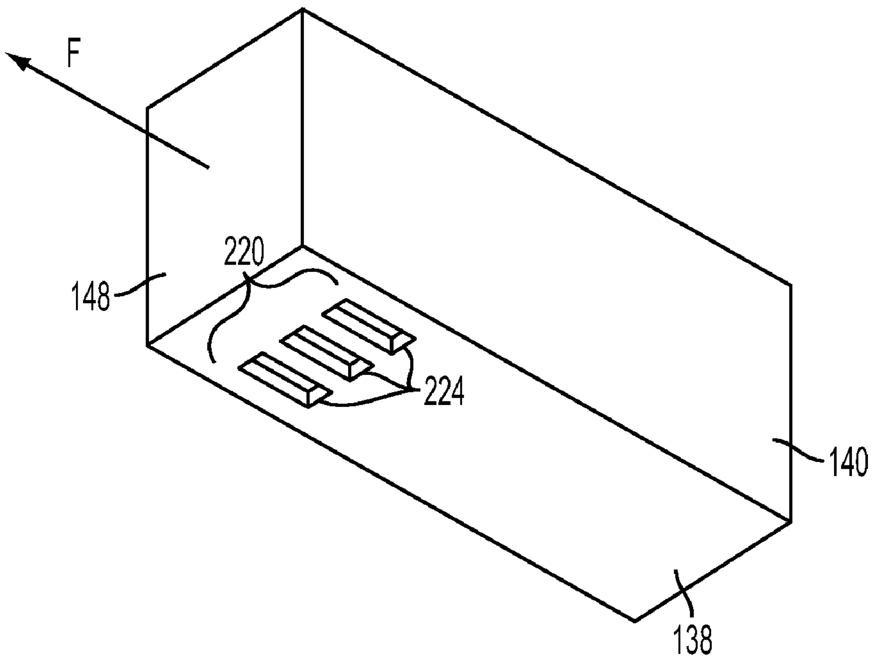
FIG. 23 is a bottom perspective view of another embodiment of a solid ink stick.
Figure 24:
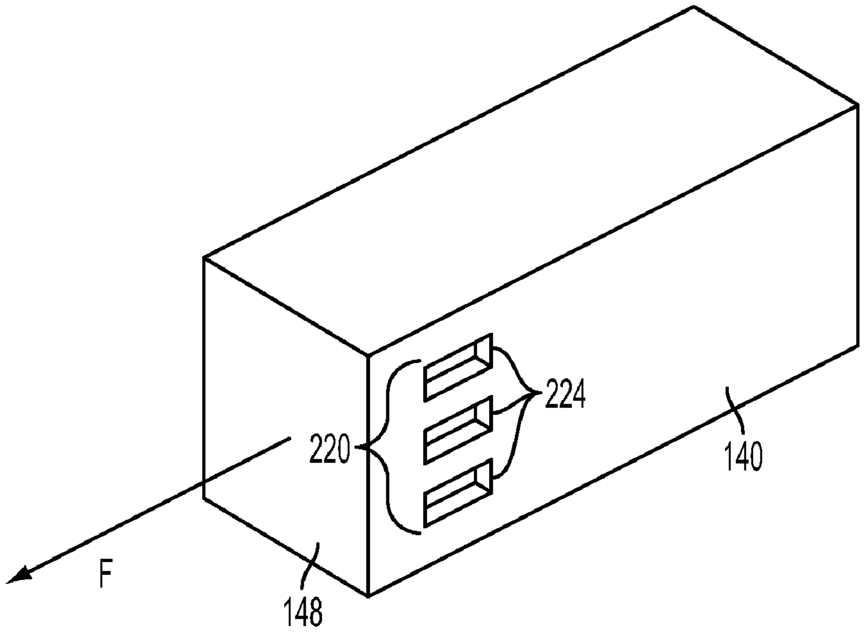
FIG. 24 is a top perspective view of another embodiment of a solid ink stick.

In the embodiments of FIG. 21, the code elements 224 of the coded sensor feature 220 are shown on the side surface 140 of the ink stick 100 although the code elements 224 may be formed on any surface or more than one surface of the ink stick. For example, FIG. 23 shows an embodiment of a coded sensor feature 220 formed in a bottom surface 138 of an ink stick 100. FIG. 24 shows an embodiment of a coded sensor feature 220 in which the code elements 224 are arrayed vertically instead of horizontally as shown in FIG. 21. The number and/or pattern of code elements 224 that may be formed into an ink stick 100 is only limited by the geometry of the ink sticks and sensor placement options in an ink loader.

The plurality of code elements 224 may be configured to interface with a sensor system in a feed channel of an ink loader to generate a coded signal pattern that corresponds to the variable control and/or attribute information. In one embodiment, the coded signal pattern encodes one or more code words. A code word may comprise one or more values, alphanumeric characters, symbols, etc. that may be associated with a meaning by an imaging device control system. The control/attribute information may be encoded into the coded sensor feature 220 by selecting the one or more code words to be indicated by the coded sensor feature 220 and implementing an encoding scheme such that the coded pattern of signals generated by the plurality of code elements corresponds to the one or more code words selected. A code word may be comprised of the signal inputs provided by one or more of the plurality of code elements 224. Thus, a plurality of code words may be generated by a code sensor feature 220. Code elements of the ink stick can include the leading edge, trailing edge and/or any number of intermediate features that directly or indirectly interact with a sensor.

Code words may be assigned to indicate control and/or attribute information that pertains to an ink stick. The code word may be may be read by an imaging device control system and translated into the control and/or attribute information pertaining to the ink stick that may be used in a number of ways by the control system. For example, the control system may use a code word as a lookup value for accessing data stored in a data structure, such as for example, a table. The data stored in the data structure may comprise a plurality of possible code words with associated information corresponding to each code word.

The control and/or attribute information that may be encoded into the coded sensor feature 220 may comprise attribute information pertaining to the ink stick, such as, for example, ink stick color, printer compatibility, or ink stick composition information, or may comprise control information pertaining to the ink stick, such as, for example, suitable color table, thermal settings, etc. that may be used with an ink stick. The encoded control and/or attribute information may be used by a control system in a suitably equipped solid ink jet printer to control print operations. For example, an imaging device control system may receive and translate the code word into the appropriate control and/or attribute information pertaining to the ink stick and may then enable or disable operations, optimize operations or influence or set operation parameters based on this decoded information.

Figure 22:
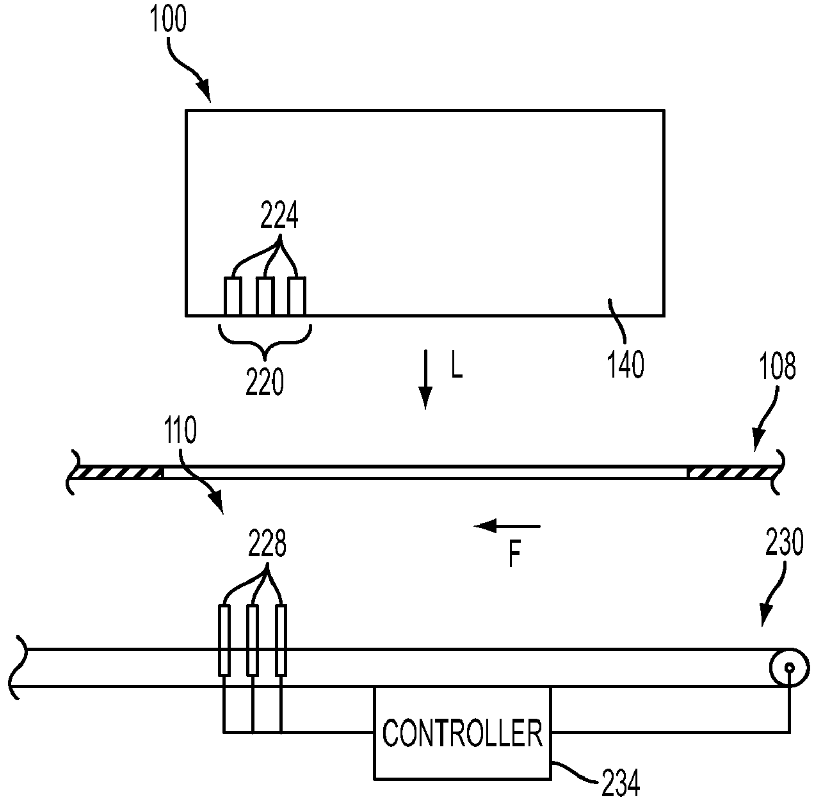
FIG. 22 is schematic side view of a sensor system for reading a coded sensor feature of the ink stick of FIG. 21.

In one embodiment, each code element 224 is configured to set or actuate a flag 228 in a feed channel. In the embodiment of FIG. 22, there is shown a flag positioned for each possible code element. Thus, the coded sensor feature 220 may be read as soon as the ink stick is inserted into the feed channel. Alternatively, the feed channel may include a flag or sensor system configured (programmed or otherwise caused to act) to serially read the coded sensor feature as the sensor feature passes the flag or sensor in the feed channel. In this case, the size or phasing of features may be determined by the transport motion distance, by controlled sensor motion or by determining the amount of ink consumed between features, thus permitting a great deal more information than is possible by just counting the number of features.

A variety of encoding schemes may be implemented in the coded sensor feature 80 such as, for example, a binary encoding scheme. To implement a binary encoding scheme, each code element 84 of the coded sensor feature 80 may be configured to actuate a sensor to generate a signal having one of two possible values such as, for example, a “high” or “low” signal. This may be accomplished by assigning an actuation depth or a range of actuation depths for each code element 84. A first signal value may be generated by code elements 224 having a depth greater than the actuation depth or within an actuation depth range, and a second signal value may be generated by code elements 224 having a depth that is less than the actuation depth or that is outside of the actuation depth range. For example, an actuation depth range of 3.5 mm to 4.5 mm may be assigned. Code elements 224 intended to actuate a sensor to produce a “high” signal may then be formed having a depth that falls between 3.5 mm and 4.5 mm. Conversely, code elements 224 intended to actuate a sensor to produce a “low” signal may be formed having a depth that falls outside of the actuation depth range.

When implementing a binary encoding scheme, the one or more code words indicated by a coded sensor feature 224 comprises one or more n-bit binary code words where n corresponds to the number of code elements 224 assigned to indicate a particular binary code word. In this embodiment, each code element 224 and corresponding binary signal generated corresponds to a bit of a binary code word. Thus, with a code word comprised of n code element inputs, there are $2^n$ possible combinations of binary signals, or code words, which may be generated. For example, three code elements assigned to indicate a single 3-bit binary code word may generate $2^3$, or 8, possible bit combinations, or code words.

Although a binary encoding scheme has been described, any suitable encoding scheme may be implemented. For example, by configuring the plurality of code elements 224 of a coded sensor feature 220 to actuate sensors to produce three or more possible signal values, base three and higher level encodings may be implemented. The preferred embodiment may be to determine the whole code word value by simultaneously sensing all elements, however, it is also possible to configure the system to allow code elements to be progressively sensed as the ink stick passes through a sensor station or area.

Referring to FIGS. 22 and 25-27, the ink delivery system 20 may include a sensor system 230 designed to interface with the one or more coded sensor features 220 of an ink stick 100. The sensor system 230 includes one or more sensors 228 for sensing or detecting the depth of each code element 224 of the coded sensor feature 220 and generating a signal corresponding to the pattern of the code elements 224, and a controller 234 for receiving the signals output by the sensors 228 and decoding the signals received from the sensors 228.

The coded signal output by the sensors 228 may be received and processed by the imaging device controller 234 into one or more n-bit binary code words. For example, the one or more binary signals comprising a code word may be provided as inputs to predetermined bit positions in an input register, stored in memory, etc. An imaging device controller 234, having access to the code words generated by the coded sensor feature 220, may compare the generated code words to data stored in a data structure, or table. The data stored in the data structure may comprise a plurality of possible code words with associated information corresponding to each value. The associated information may comprise control/attribute information that pertains to the ink stick. The imaging device controller 234 may then enable or disable operations, optimize operations or influence or set operation parameters based on the control/attribute information associated with each code word generated by a coded sensor feature 220. For example, if a code word indicates that an ink stick is not compatible with or not intended to be used with the imaging device, the control system may generate an alert signal or message to an operator and/or service personnel.

Coded sensor features 220 may be used in combination with other keying, orientation and alignment features. This combination of features provides multiple mechanisms for ensuring proper loading of ink sticks and for providing control information pertaining to an ink stick to an imaging device control system. Alternatively, the coded sensor features may be used alone to provide the mechanisms for ensuring proper loading and conveying of information to the control system. Thus, ink sticks may be provided that can take a simplified form such as a rectangle or similar featureless shape. The only thing needed to distinguish ink sticks from one another may be the pattern or depth of the coded sensor features incorporated into the ink stick.

As mentioned above, a coded sensor feature 220 may be used to ensure proper loading of an ink stick. As discussed above, the sensor system may be positioned to "read" the coded sensor feature 220 as soon as the ink stick is inserted into the feed channel as shown in FIG. 22. If the coded signal generated by the coded sensor feature indicates that the ink stick is compatible or configured for use with the feed channel, normal operations may continue. If the coded signal indicates that the ink stick is not configured for use with the feed channel, the controller may halt printing operations, issue a control panel message or other such action. In this case the controller determination of ink suitability may result in any number of responses of the imaging device system, including disabling the transport, moving it for optimal removal or examination of the ink stick, issuing user messages, prompts or warnings, initiating network communications and so forth. In one embodiment, the controller may be configured to halt operations when an incompatible, unrecognized or damaged ink stick is detected by disabling the drive member 124 to ensure that the ink stick is not delivered to the melt plate.

Figure 25:
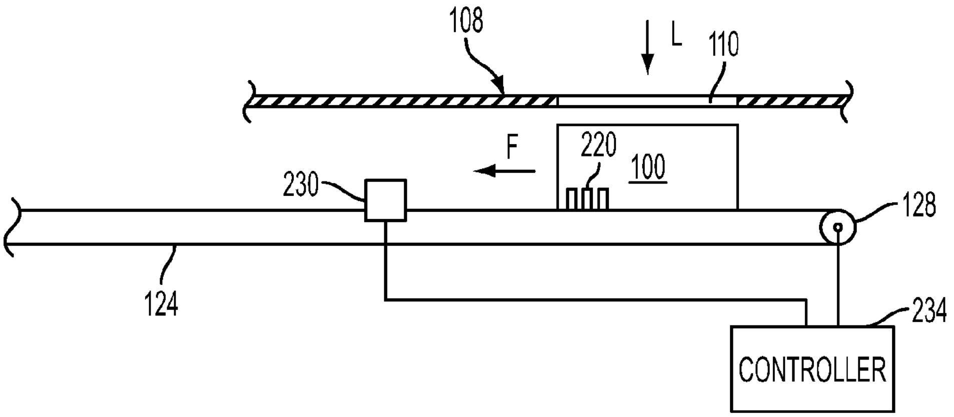
FIG. 25 is schematic side view of a sensor system for reading a coded sensor feature of the ink stick of FIG. 21.
Figure 26:
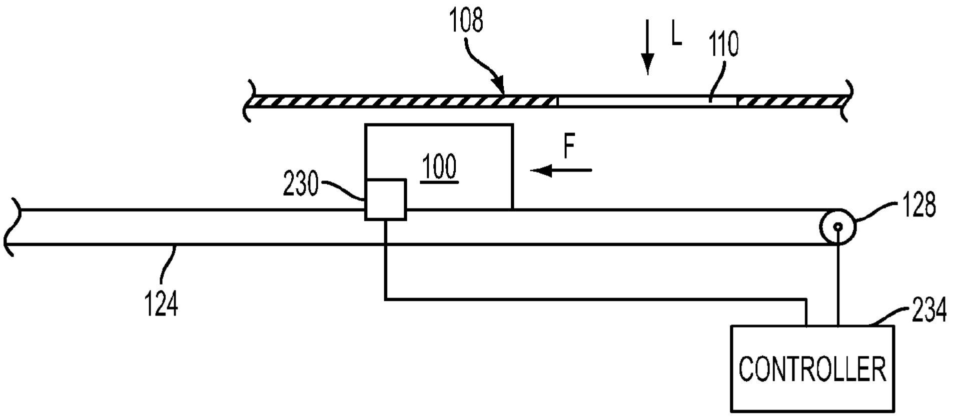
FIG. 26 is another schematic side view of the sensor system for reading a coded sensor feature shown in FIG. 25.
Figure 27:
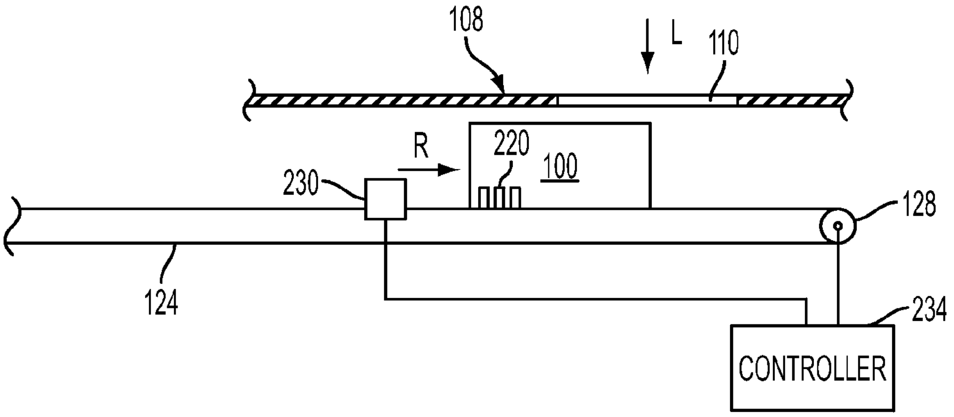
FIG. 27 is another schematic side view of the sensor system for reading a coded sensor feature shown in FIG. 25.

The sensor system does not have to be placed at the insertion opening of the feed channel. Referring to FIGS. 25-27, there is shown an embodiment in which the sensor system 230 is positioned in the feed channel downstream from the insertion opening 110. In this embodiment, an ink stick 100 is inserted into the feed channel and moved by the drive belt 124 in direction F as shown in FIG. 25. Travel distance may be a small fraction of the stick length, could be greater than the length of the stick or may be any other suitable distance based on the geometry of the stick sensing features and the sensor system. An alternative to a forward sensing position is to move the stick in a direction opposite the melt end from the insertion opening for sensor reading. This alternative, not illustrated, would allow an appropriate ink stick and sensing system to function when forward ink movement is impeded by a channel so full of sticks that they nearly block the insertion opening. Referring to FIG. 26, once the ink stick 100 reaches the sensor system 230 the coded sensor feature 220 of the ink stick actuates the sensor system to generate a coded signal indicating control information pertaining to the ink stick. The control information may comprise color of ink stick, or ink composition information, etc. The controller receives the coded signal and decodes it to determine the control information. The controller may then determine if the ink stick is compatible with the feed channel or with the solid imaging device. If the control information pertaining to the ink stick indicates that the ink stick is compatible then imaging operations may proceed. If the control information indicates that the ink stick is not compatible, the controller 234 may be configured to reverse the drive belt 124 in direction R to bring the ink stick 100 back to the insertion opening 110 so that the incompatible ink stick may be removed as shown in FIG. 27. At this point, the controller 134 may be configured to disable movement of the drive member until the ink stick is removed.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of feeding ink sticks in an ink delivery system of a phase change ink imaging device, the method comprising:

receiving a first solid ink stick on a feed path of an ink delivery system of a phase change ink imaging device, the first solid ink stick having a first contoured end and a second contoured end;

receiving a second solid ink stick on the feed path of the ink delivery system of the phase change ink imaging device, the second solid ink stick having a first contoured end and a second contoured end, the first solid ink stick preceding the second solid ink stick on the feed path of the ink delivery system;

nesting a plurality of bosses on the second contoured end of the first ink stick in a plurality of boss recesses on the first contoured end of the second ink stick and nesting a plurality of bosses on the first contoured end of the second ink stick in a plurality of boss recesses on the second contoured end of the first ink stick, the plurality of nested bosses and boss recesses acting to limit horizontal and vertical movement of the first and second ink sticks with respect to each other, and the contoured ends complementing the feed path to enable the first and the second solid ink sticks to resist buckling in response to another solid ink stick abutting the first contoured end of the first solid ink stick or the second contoured end of the second solid ink stick.

2. The method of claim 1, the nesting of the plurality of bosses further comprising:

nesting a pair of bosses oriented at a non parallel angle on the trailing end of the first ink stick in a complementary pair of boss recesses on the leading end of the second ink stick, and nesting pair of bosses oriented at a non parallel angle on the leading end of the second ink stick in a complementary pair of boss recesses on the trailing end of the first ink stick.

3. The method of claim 1, the receiving of the first ink and second sticks on the feed path further comprising:

receiving the first and second ink sticks on a feed path having at least one curved section, at least a portion of a bottom surface of the first and second ink sticks having a radius of curvature similar to a radius of curvature of the curved section of the feed path.

4. The method of claim 1, further comprising:

moving the first and second ink sticks along the feed path toward a melt plate at a melt end of the feed path.

5. The method of claim 4, further comprising:

pressing the first contoured end of the first ink stick against the melt plate while the nested plurality of bosses and boss recesses of the first and second ink sticks maintain alignment of the first ink stick against the melt plate.

6. The method of claim 1, the receiving of the first and second ink sticks on the feed path further comprising:

inserting the first and second ink sticks through an insertion opening at an insertion end of the feed path.

7. The method of claim 6, the inserting of the first and second ink sticks through an insertion opening further comprising:

matching a key on the first solid ink stick to a complementary key opening of the insertion opening to enable the first solid ink stick to be received on the feed path; and matching a key on the second solid ink stick to a complementary key opening of the insertion opening to enable the second solid ink stick to be received on the feed path.

8. The method of claim 1, further comprising:

moving the first and second ink sticks along the feed path with a drive belt.

* * * * *